United States Patent
Urso et al.

(10) Patent No.: US 11,732,755 B2
(45) Date of Patent: Aug. 22, 2023

(54) PULLEY ASSEMBLY

(71) Applicant: AKTIEBOLAGET SKF, Gothenburg (SE)

(72) Inventors: Stefano Urso, Bologna (IT); Ralf Peters, Remscheid (DE); Rosario Pedulla, Bologna (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/688,338

(22) Filed: Mar. 7, 2022

(65) Prior Publication Data

US 2022/0290721 A1 Sep. 15, 2022

(30) Foreign Application Priority Data

Mar. 12, 2021 (IT) .................... 102021000005843

(51) Int. Cl.
*F16C 33/58* (2006.01)
*F16C 35/067* (2006.01)
*F16C 33/62* (2006.01)

(52) U.S. Cl.
CPC .......... *F16C 33/581* (2013.01); *F16C 33/586* (2013.01); *F16C 33/62* (2013.01); *F16C 35/067* (2013.01); *F16C 2226/76* (2013.01); *F16C 2361/63* (2013.01)

(58) Field of Classification Search
CPC ........ F16C 19/06; F16C 19/08; F16C 33/581; F16C 33/586; F16C 33/62; F16C 35/067; F16C 2361/63
See application file for complete search history.

(56) References Cited

U.S. PATENT DOCUMENTS

| 4,602,875 A | 7/1986 | Doerr et al. |
| 2010/0284642 A1* | 11/2010 | Mineno ................ F16C 37/007 384/569 |
| 2015/0176641 A1 | 6/2015 | Arnault et al. |
| 2015/0292603 A1 | 10/2015 | Cherioux et al. |
| 2018/0306243 A1 | 10/2018 | Akihiro et al. |

FOREIGN PATENT DOCUMENTS

| JP | 2004011730 A | * | 1/2004 | ............ F16C 33/586 |
| JP | 2004232839 A | * | 8/2004 | ............ F16C 33/588 |
| JP | 2009138766 A | * | 6/2009 | ............ F16C 35/067 |

OTHER PUBLICATIONS

Search Report for corresponding Italian Patent Application No. 102021000005843 dated Aug. 29, 2021.

* cited by examiner

*Primary Examiner* — Phillip A Johnson
(74) *Attorney, Agent, or Firm* — Reed Smith LLP

(57) ABSTRACT

A pulley assembly for belt tensioners having a bearing unit provided with a rotating outer ring and made of metal, an outer wheel body overmoulded onto the outer ring to rotate with the outer ring and interact with a belt, a gripping surface at the interface between the outer wheel body and the outer ring to prevent circumferential slipping between the outer wheel body and the outer ring; and an axial retainer integral with the outer ring and having two lateral edge members located axially on opposite sides of the gripping surface to engage the outer wheel body and prevent axial movement of the outer wheel body relative to the outer ring.

11 Claims, 2 Drawing Sheets

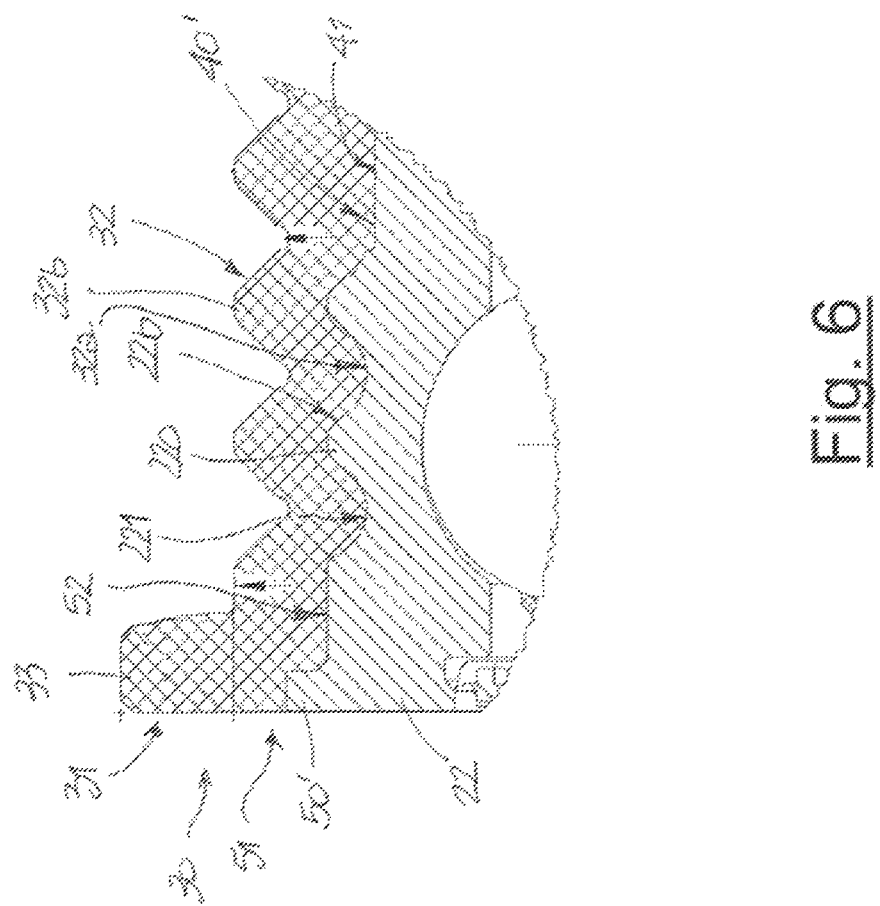
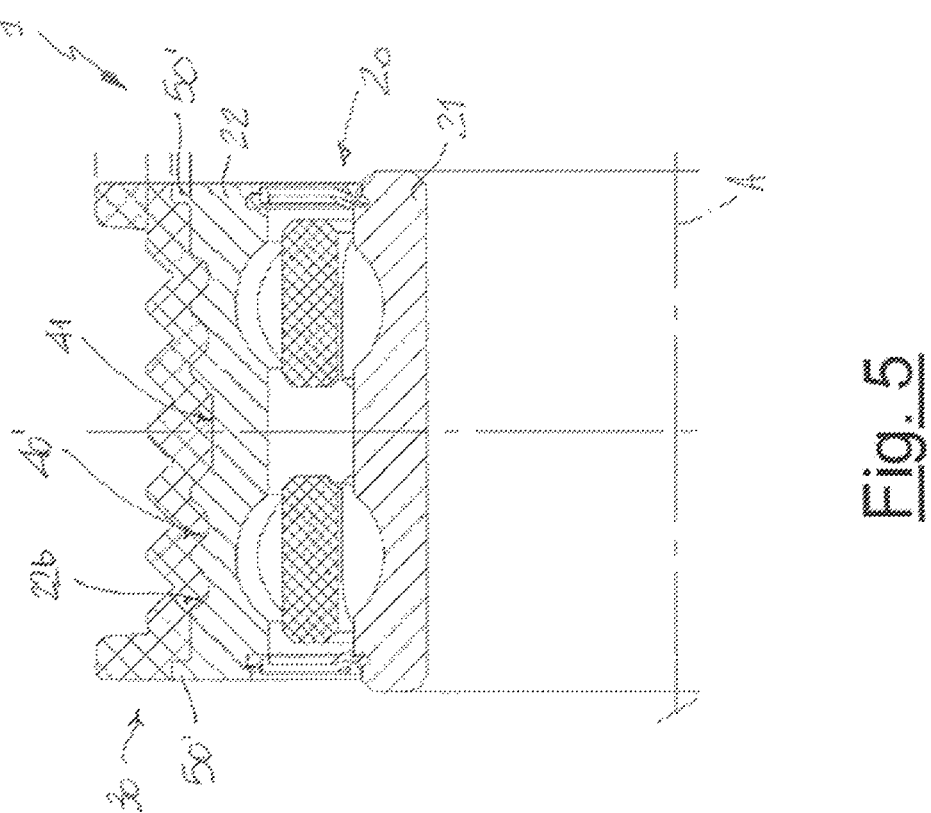

PULLEY ASSEMBLY

CROSS-REFERENCE TO RELATED APPLICATIONS

This application is based on and claims priority to Italian Patent Application No. 102021000005843 filed on Mar. 12, 2021, under 35 U.S.C. § 119, the disclosure of which is incorporated by reference herein.

Field The present disclosure relates to a pulley assembly for a bearing unit.

BACKGROUND

In pulley assemblies, belt tensioners may be used in lift or hoist systems.

BRIEF DESCRIPTION OF THE DRAWINGS

Various embodiments in accordance with this disclosure will now be described with reference to the appended drawings illustrating non-limiting exemplary embodiments, in which:

FIG. 5 is a cross-sectional view of an exemplary embodiment of a pulley assembly according to this disclosure; and FIG. 6 shows a detail view of the pulley assembly in FIG. 5, on an enlarged scale and with parts in cross-section and parts removed for clarity.

DETAILED DESCRIPTION

In pulley assemblies, a bearing unit has a fixed inner ring and a rotating outer ring coaxial with the inner ring, made of metal, while an outer wheel body is made of a plastic material overmoulded onto the outer ring of the bearing unit to rotate with it, and is intended to interact with a belt.

To prevent the outer body of the wheel from slipping axially and circumferentially with respect to the outer ring of the bearing unit, such outer ring is provided with a gripping surface generally defined by a plurality of indentations and recesses which interpenetrate with the outer body of the wheel to make it angularly and axially of one piece with the outer ring. However, in some applications where loads are higher, or where action of the belt on the outer body of the wheel tends to cause axial displacement, or where there is a need to limit lateral displacement of the belt itself, a gripping surface evidences technical limitations. Attempts have been made to overcome these, for example, by making the outer body of the wheel of a piece of the same material as the outer ring of the bearing unit and providing it with a corrugated outer guide surface.

Although the latter solution has proved to be more resistant than that with the overmoulded outer wheel body, it does present increased manufacturing costs and, above all, makes the pulley assembly particularly heavy, whereas less weight is desirable.

The object of the present disclosure is to provide a pulley assembly which, while meeting the requirements of lightness and the containment of production costs, is free from the disadvantages described above.

Figure 3:
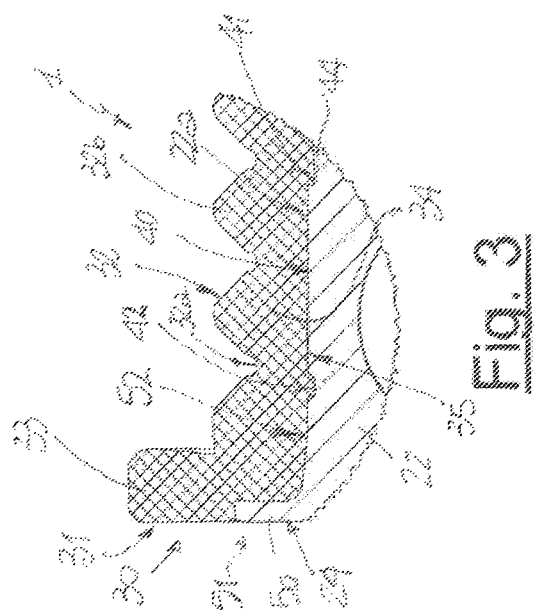
FIGS. 3 and 4 illustrate, on an enlarged scale, respective details of the pulley assembly in FIG. 2, with parts in cross-section and parts removed for clarity.
Figure 4:
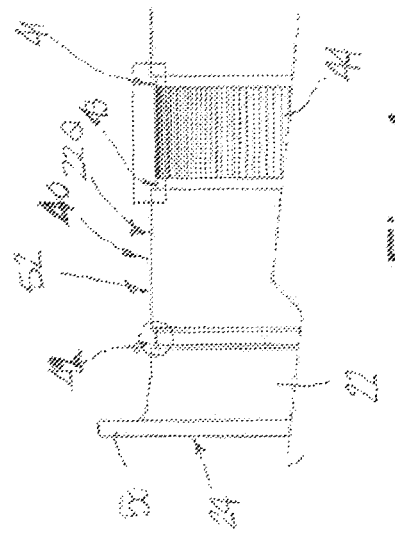
Figure 2:
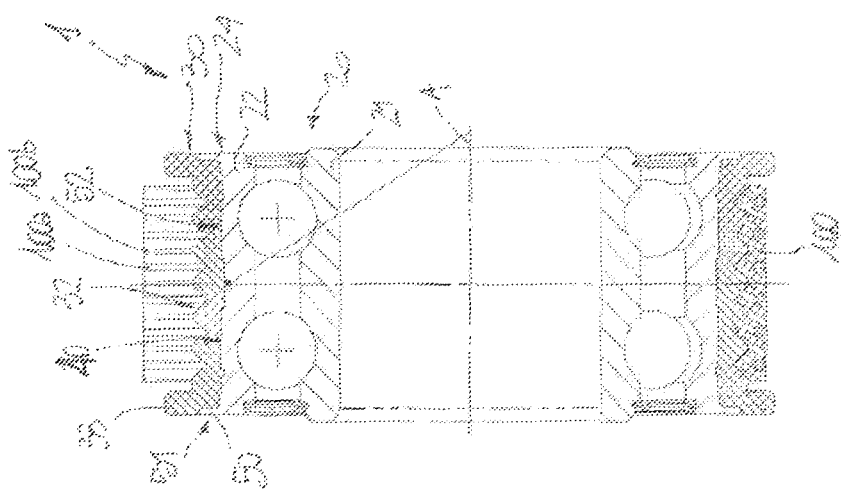
FIG. 2 is a cross-sectional view of the pulley assembly in FIG. 1.
Figure 1:
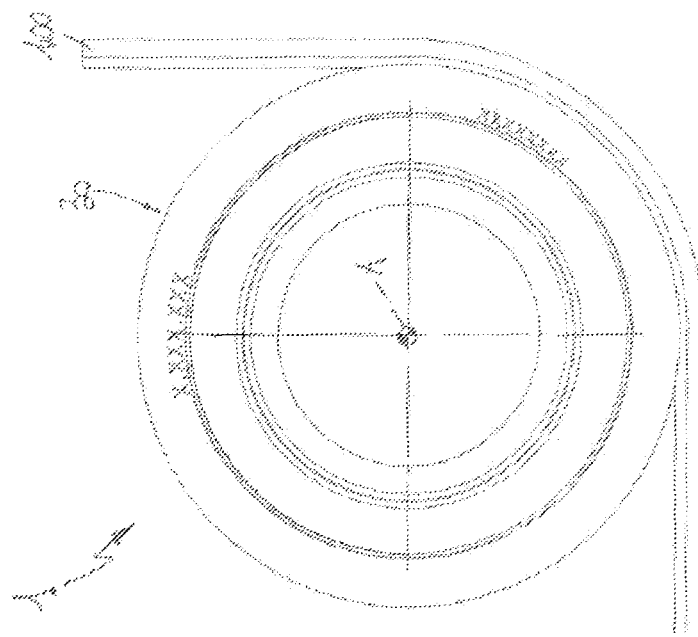
FIG. 1 is a side view in elevation of an exemplary embodiment of a pulley assembly according to this disclosure.

FIGS. 1 and 2 illustrate a pulley assembly 1 for a belt tensioner 100 in lift or hoist systems.

In various embodiments, a pulley assembly 1 may have a central axis A, and include a bearing unit 20 provided with a fixed inner ring 21 and a rotating outer ring 22 coaxial with inner ring 21 and made of metal, an outer wheel body 30 made of plastic material and overmoulded onto bearing unit 20 such that outer wheel body 30 rotates together with outer ring 22, and a gripping surface 40 located at an interface between outer wheel body 30 and outer ring 22 to assist in preventing at least circumferential slipping between outer wheel body 30 and outer ring 22. In various embodiments a gripping surface 40 may be defined by an outer cylindrical surface 22a of an outer ring 22, a central annular groove 41 provided along a centre line of symmetry of a bearing unit 20 on cylindrical surface 22a, and two annular grooves 42 provided laterally and axially on cylindrical surface 22a each on a respective side opposite of a central annular groove 41. Two annular grooves 42 may have a substantially trapezoidal shape in an axial cross-section. Central annular groove 41 may be provided, within a cylindrical base 43, with a plurality of teeth or knurls 44, axially and uniformly distributed about axis A. In various embodiments, the plurality of teeth or knurls 44 may have a radial height that is less than a radial depth of central annular groove 41 in relation to cylindrical surface 22a. In such embodiments, teeth or knurls 44 may not protrude radially beyond a central annular groove 41.

A pulley assembly 1 may further include lateral annular axial retaining edge members 50. In various embodiments, lateral annular axial retaining edge members 50 may be a single piece together with an outer ring 22 of a bearing unit 20 and may be each located axially on a respective opposite side of a gripping surface 40 to engage an outer wheel body 30 and prevent axial movement of outer wheel body 30 with respect to outer ring 22.

In various embodiments, lateral annular edge members 50 may extend radially, projecting from a surface 22a of an outer ring 22, and each may be flush with a respective axial annular surface 31 of an outer wheel body 30 and flush with a respective axial outer annular surface 24 of outer ring 22. In various embodiments, lateral annular edge members 50 may formed as a whole with rotating outer ring 22.

In various embodiments, lateral annular edge members 50 may be obtained by a machining operation that removes material from a rotating outer ring 22. Lateral edge members 50 may define a bilateral axial retainer 51 for retaining an outer wheel body 30 and a U-shaped radial seat 52 onto which outer wheel body 30 is moulded. A gripping surface 40 with a central annular groove 41 and annular grooves 42 also lies within radial seat 52, and this together with bilateral axial retaining means 51, may block relative movement between outer wheel body 30 and rotating outer ring 22, both circumferentially and axially. Furthermore, through bilateral axial retaining means 51, both effects of thermal expansion when in use and effects of ageing of a plastic material of outer wheel body 30 have no effect on stability of a relative position between outer wheel body 30 and rotating outer ring 22.

In various embodiments, an outer body 30 may interact with a belt 100 by laterally guiding belt 100. In such embodiments, an outer body 30 may include a shaped outer surface 32 that may interact with a belt 100 and lateral annular edges 33, located axially on a respective side opposite a shaped outer surface 32. Lateral annular edges 33 may laterally guide belt 100 to limit any axial displacement of belt 100 with respect to an axis of symmetry A of a bearing unit 20. Lateral annular edges 33 may further be axially bounded by a relative lateral annular surface 31. In various embodiments, a shaped outer surface 32 may be a corrugated surface provided with a plurality of longitudinal V-shaped recesses 32a and a plurality of teeth 32b, which may engage in a matching manner a plurality of teeth 100a and a plurality of recesses 100b in a belt 100. As a result of this mutual engagement between outer surface 32 and belt 100, any possible oscillation of belt 100 also gives rise to axial forces on outer wheel body 30, which, if not adequately secured on rotating outer ring 22 by a bilateral axial retaining means 51, may in the long run become axially misaligned, increasing noise and wear.

In various embodiments, an outer wheel body 30 may further include a cylindrical wall 34 radially bounded on an outside by a shaped outer surface 32 and radially bounded on an inside by a shaped inner surface 35 which, through overmoulding, may copy the profile of a cylindrical surface 22a. Since an outer wheel body 30 may be overmoulded onto a bearing unit 20, that is, onto a rotating outer ring 22 within a seat 52, annular edge members 50 may be at least partly embedded in outer wheel body 30, and may have radial dimensions smaller than a minimum radial thickness of cylindrical wall 34 at shaped outer surface 32. Furthermore, two lateral annular edge members 50 may each have an axial thickness smaller than axial dimensions of a respective lateral annular edge 33. This may provide lateral annular edge members 50 with support so that they may bend if belt 100 abuts one of annular edges 33, and impart a relatively reduced weight to a pulley assembly 1 while still allowing belt 100 to be correctly routed. This may also provide excellent resistance to axial forces of belt 100 on outer wheel body 30, which may be secured axially by a bilateral axial retaining means 51, and a mutual grip of a groove 41 and a groove 42, and circumferentially by a mutual grip of cylindrical wall 34 against a plurality of teeth or knurls 44.

An exemplary pulley assembly 1 consistent with this disclosure may reduce noise, by belt 100 being in contact with the plastic of an outer wheel body 30, and reduce weight through making outer wheel body 30 of plastic material. Furthermore, use of a plastic material improves versatility of a pulley assembly 1 because a wheel body 30 may take a variety of shapes without introducing complications into production.

According to various embodiments, not illustrated but easily deducible from what has been set out and described herein, lateral annular edge members 50 may be made of a single piece with an outer ring 22 of a bearing unit 20 and be axially recessed by an amount approximately equal to a radial thickness of lateral annular edge members 50. In some embodiments, the amount recessed may be a multiple of the radial thickness of lateral annular edge members 50, but not exceeding three. In other embodiments, the amount recessed may not exceed a thickness of lateral annular edges 33. In this way, each of lateral annular edge members 50 may not be flush with a respective axial annular surface 31 of outer wheel body 30, but may be completely embedded within outer wheel body 30. At the same time, lateral edge members 50 may be embedded in an axial relationship with a respective lateral annular edge 33 and may provide support against bending.

This alternative arrangement is particularly suitable for applications of pulley unit 1 where atmospheric agents might attack the material of the two lateral annular edge members 50, limiting their service life.

In various embodiments, lateral annular edge members 50 embedded in an outer wheel body 30 may have a radial dimension larger than a minimum radial thickness of a cylindrical wall 34 at a shaped outer surface 32, and may also extend up to an inside of a respective lateral annular edge 33 constituting direct reinforcement for lateral annular edges 33 themselves.

This arrangement, which inevitably entails an increase in the weight of the pulley assembly according to the present invention, is suitable in cases of particularly heavy-duty and stressed applications, while remaining decidedly competitive in comparison with the current arrangements being introduced.

In various embodiments, a gripping surface 40' may include a corrugated surface 22b provided with a plurality of annular lands 220 and a plurality of annular recesses 221 axially alternating with each other from a central annular groove 41 as far as a corresponding lateral annular axially retaining edge member 50'. Lateral edge members 50', together with a U-shaped radial seat 52, annular lands 220, and annular recesses 221, may define a bilateral axial retaining means 51 for an outer wheel body 30, on which outer wheel body 30 is itself moulded. Annular lands 220 and alternating annular recesses 221 of surface 22b may follow a pattern of teeth 32b and a longitudinal V-shaped recess 32a in a shaped outer surface 32, and, as a result of this match between outer surface 32 and surface 22b, in testing gripping surface 40' has improved function of axially retaining outer wheel body 30 in relation to an outer ring 22 in both experiments and a test phase. Thus, in various embodiments, a plurality of lateral annular axially retaining edge members 50' may have a radial height less than a radial height of edge members 50 to an advantage of a radial and/or axial thickness of an outer pulley body 30.

Depending on a loading range of a pulley assembly 1 when in use, a gripping surface 40' may have more or fewer annular lands 220 and annular recesses 221 alternating axially with each other. In at least one embodiment, a gripping surface 40' may have two annular lands 220 and two annular recesses 221. In other embodiments, a number of annular lands 220 and a number of annular recesses 221 of a gripping surface 40' may increase directly proportional to an axial dimension of a pulley assembly 1 and a width of a belt 100 as a loading range of pulley assembly 1 increases.

In addition to exemplary embodiments described herein, it must be understood that there are many other variants. It should also be understood that these embodiments are only illustrative and do not limit either the scope of the disclosure, its applications, or its possible configurations. On the contrary, although the above description will allow a person skilled in the art to implement the present disclosure according to at least one exemplified embodiment thereof, it should be understood that many variants of the components described are possible without going beyond the scope of the disclosure as defined in the appended claims, which are to be interpreted literally and/or according to their legal equivalents.

We claim:
1. A pulley assembly for belt tensioners, comprising:
a bearing unit provided with a fixed inner ring and a rotating outer ring coaxial with the inner ring and made of metal;
an outer wheel body overmoulded onto the bearing unit and comprising two lateral annular edges on opposite axial ends of the outer wheel body, wherein the outer wheel body rotates with the rotating outer ring and is configured to guide a belt, and wherein the two lateral annular edges define a radial seat between them;

a gripping surface at an interface between the outer wheel body and the outer ring of the bearing unit to prevent at least circumferential slipping between the outer wheel body and the outer ring; and an axial retainer formed as a single piece together with the outer ring and arranged axially on respective opposite sides of the gripping surface to engage the outer wheel body.

2. The pulley assembly according to claim 1, wherein the axial retainer further comprises two lateral annular edge members made of a single piece together with the outer ring, the lateral annular edge members being flush with a respective axial annular surface of the outer wheel body.

3. The pulley assembly according to claim 2, wherein the outer wheel body further comprises:

an outer surface configured to interact with the belt; and two lateral annular surfaces configured to axially bound a respective lateral annular edge of the two lateral annular edges of the outer wheel body.

4. The pulley assembly according to claim 3, wherein the outer surface shaped to interact with the belt comprises a corrugated surface provided with a plurality of longitudinal V-shaped recesses and a plurality of longitudinal V-shaped teeth.

5. The pulley assembly according to claim 3, wherein the two lateral annular edge members are embedded in the outer wheel body and have a radial dimension smaller than a radial thickness of the outer wheel body at the shaped outer surface.

6. The pulley assembly according to claim 5, wherein the two lateral annular edge members have an axial thickness smaller than an axial dimension of the lateral annular edges.

7. The pulley assembly according to claim 1, wherein the gripping surface further comprises a central annular groove provided along a central axis of symmetry of the bearing unit and two annular grooves located axially on respective opposite sides of the central annular groove.

8. The pulley assembly according to claim 7, wherein central annular groove comprises a plurality of knurls within a cylindrical base of the central annular groove, the plurality of knurls being axially and uniformly distributed about the axis of symmetry of the bearing unit.

9. The pulley assembly according to claim 7, wherein the gripping surface further comprises a substantially corrugated surface comprising a plurality of annular lands and a plurality of recesses alternating axially with each other from the central annular groove to a respective lateral annular axially-retaining edge member.

10. The pulley assembly according to claim 1, wherein the gripping surface further comprises a substantially corrugated surface comprising a plurality of annular lands and a plurality of recesses alternating axially with each other from a central annular groove of the gripping surface to a respective lateral annular axially-retaining edge member.

11. A pulley assembly for belt tensioners, comprising:

a bearing unit comprising a fixed inner ring and a rotating outer ring coaxial with the inner ring, the bearing unit being made of metal;

an outer wheel body overmoulded onto the bearing unit and comprising:

two lateral annular edges on opposite axial ends of the outer wheel body, wherein the two lateral annular edges define a radial seat between them;

a plurality of radially extending V-shaped teeth and a plurality of V-shaped recesses alternating axial with the plurality of V-shaped teeth, wherein the plurality of radially extending V-shaped teeth and the plurality of V-shaped recess are housed axially between the two lateral annular edges and within the radial seat;

wherein the outer wheel body rotates with the rotating outer ring and is configured to guide a belt;

a gripping surface at an interface between the outer wheel body and the outer ring of the bearing unit configured to prevent circumferential slipping between the outer wheel body and the outer ring; and an axial retainer formed as a single piece together with the outer ring and arranged on respective opposite axial sides of the gripping surface to engage the outer wheel body.

* * * * *